3,304,343
PROCESS FOR TRANSFERRING DOUBLE BOND OF OLEFIN

Akio Mitsutani, Kurashiki, Japan, assignor to Kurashiki Rayon Company Limited, Kurashiki, Japan, a corporation of Japan
No Drawing. Filed Apr. 27, 1964, Ser. No. 363,002
Claims priority, application Japan, May 2, 1963, 38/22,948
2 Claims. (Cl. 260—683.2)

The present invention relates to a method of transferring a double bond of an olefin hydrocarbon in the molecular chain in which in order to prevent the occurrence of a skeletal isomerization reaction which changes the number of branches of the olefin hydrocarbon, a specific catalyst is used. In the invention a solid phosphoric acid catalyst, which consists of phosphoric acid deposited on a carrier mainly consisting of silica and/or metal oxide, is used after either (a) being calcined at a temperature above 700° C. and less than 1,100° C. for more than 2 hours or (b) after being subjected to calcination at a temperature lower than 1,100° C. and the water soluble substances being extracted by water.

The solid phosphoric acid catalyst which consists of phosphoric acid deposited on a carrier mainly consisting of silica and/or metal oxides (hereinafter referred to as "solid phosphoric acid catalyst") is one of the most important catalysts often used industrially for vapour phase catalytic reactions such as the polymerization reaction of olefin hydrocarbons, isomerization, alkylation, and hydration reaction of olefins, dehydration of alcohols and catalytic cracking of hydrocarbons. When a solid phosphoric acid catalyst is used as a catalyst for the isomerization reaction of olefin hydrocarbons it is used for manufacturing a branched olefin from a normal olefin or changing the number of branches of the branched olefin. Since the solid phosphoric acid catalyst is mainly used for the above mentioned purposes, the composition of phosphoric acid existing in the catalyst is such that a greater part takes the form of pyrophosphoric acid or orthophosphoric acid as a result of activation by calcining at a temperature of from 150 to 250° C., very seldom up to 600° C. When, however, the solid phosphoric acid catalyst thus produced is used to transfer a double bond of an olefin in the molecular chain without changing the number of branches, there is the disadvantage that the yield is very low due to the occurrence of skeletal isomerization reaction and polymerization reaction.

The inventor has found that if water soluble substances are removed from the solid phosphoric acid catalyst, the catalyst has sufficient activity for the double bond transferring reaction, but it substantially loses activity for skeletal isomerization and polymerization. This fact is absolutely new matter which as far as the inventor is aware has never been reported before by any person. It has the special feature of removing pyrophosphoric acid, orthophosphoric acid and other water soluble substances which have been considered as the most active compounds in solid phosphoric acid catalysts.

As the method of removing water soluble substances from the solid phosphoric acid catalysts it was found that there are two effective processes. In one process the solid phosphoric acid catalyst is calcined at a temperature higher than 700° C. and lower than 1,100° C. for 2 hours, preferably for more than 5 hours. In the other process, after the solid catalyst is calcined at a temperature lower than 1,100° C., the water soluble substances in the catalyst are extracted with water. Said calcination may be carried out in oxygen, nitrogen, air and any atmosphere under the coexistence of gases inert to the catalyst.

The solid phosphoric acid catalyst can be manufactured by adhering phosphoric acid to a carrier mainly consisting of silica and/or metal oxides, then by drying. As the carrier mainly consisting of silica use may be made of diatomaceous earth, silica-gel and pumice stone, etc., and as metal oxides are used alumina, titania, zirconia, magnesia and the like metal oxides or mixtures thereof.

The olefins to be used for the method of the invention are aliphatic olefin hydrocarbons having 4 to 10 carbon atoms. According to the method of the invention the catalyst can be most effectively applied when a double bond in the molecular chain is to be transferred without changing the number of branches of the olefin hydrocarbon, such as, when the isomerization reaction between 1-butene and 2-butene is carried out by suppressing the isobutene-forming reaction or when 2-methyl pentene-2 is synthesized with high yield from 2-methyl pentene-1.

The reaction temperature used in the method of the invention is from 0° C. to 500° C. under reduced pressure, atmospheric pressure or high pressure wherein olefin is in the state of vapor or liquid under each of the above conditions.

The process of the invention may be carried out using a fixed catalytic bed system, a moving catalytic bed system or a fluidized catalytic process.

The reaction products either after being cooled or in the state in which they are produced, are collected, they are separated by various known processes such as distillation, or adsorption separation, and the non-reacted substances are recovered and put back for reuse.

The method of the invention will now be explained further in detail by means of examples.

Example 1

A solid phosphoric acid catalyst commercially available in which phosphoric acid is deposited on diatomaceous earth and dried and calcined at a temperature lower than 200° C. to a required shape was heat treated in air at 980° C. for 16 hours. 15.0 cc. of the catalyst were packed into a quartz tube in an electric furnace, the catalyst layer was maintained at 380° C. and 520 cc./min. of 1-butene were passed therethrough to effect isomerization. The gases after the reaction were directly conducted to a gas chromatographic device and analyzed at 0° C. by using a benzyl cyanide-silver nitrate column and using helium as the carrier gas.

The analysis value of the gas produced in 2 hours after the reaction started showed 2.3% isobutene, 25.2% 1-butene, 42.3% trans-2-butene, and 30.2% cis-2-butene, which shows that the production of isobutene, lower hydrocarbon, and polymer have been considerably suppressed. For comparison, when a solid phosphoric acid catalyst which was heat treated at 400° C. for 16 hours was used the analysis value of gases produced under the same conditions was isobutene 13.5%, 1-butene 23.7%, trans-2-butene 32.9%, cis-2-butene 28.3% and lower hydrocarbon 1.6%. The degradation of activity of the catalyst surface was extremely large due to the polymerization reaction.

Example 2

After the solid phosphoric acid catalyst commercially available was heat treated in air at 500° C. for 16 hours it was extracted with water by using a Soxhlet extractor until the extracted liquid did not show acidic properties. Then 20 cc. of the catalyst were packed into a quartz tube in an electric furnace and 3.83 lit./hr. of 1-butene at 250° C. were passed therethrough to effect isomerization. The value of analysis of the gaseous products in 1 hour after the reaction started was isobutene 0.5%, 1-butene 21.9%, trans-2-butene 43.3%, cis-2-butene 34.3%. Reaction rate of 1-butene was 78.1% and the selectivity to 2-butene was 99.4%.

Example 3

After a solid phosphoric acid catalyst commercially available was calcined at 1,000° C. for 10 hours and 50 parts of the product were taken out and introduced together with 100 parts of 2-methyl pentene-1 and heated at 60° C. for 40 minutes, then 85 parts of 2-methylpentene-2 could be obtained at substantially 100% selectivity.

What I claim is:

1. A method of transferring a double bond of an aliphatic monoolefin having from 4 to 10 carbon atoms from one position to another position in the molecular chain which comprises contacting the aliphatic monoolefin with a catalyst free of water-soluble components prepared by (1) calcining a solid phosphoric acid catalyst consisting of phosphoric acid deposited on a carrier consisting essentially of silica, the calcination being carried out at a temperature in the range of about 500° C. to 1100° C., and (2) washing the calcined catalyst with water to remove water-soluble components from said calcined catalyst.

2. A method according to claim 1 which comprises using a catalyst calcined at a temperature of about 500° C.

References Cited by the Examiner

UNITED STATES PATENTS

| | | | |
|---|---|---|---|
| 2,330,115 | 9/1943 | Drennan | 260—683.2 |
| 2,694,686 | 11/1954 | Reeves et al. | 260—683.15 |
| 3,112,350 | 11/1963 | Bielawski et al. | 260—683.15 |
| 3,211,801 | 10/1965 | Holm et al. | 260—683.2 |

DELBERT E. GANTZ, *Primary Examiner.*

R. SHUBERT, *Assistant Examiner.*